United States Patent [19]

Couch

[11] Patent Number: 5,044,120

[45] Date of Patent: Sep. 3, 1991

[54] DOUBLE-WALLED PLANT POT WITH GRADUATED FERTILIZER

[76] Inventor: David M. Couch, General Delivery, Mattawa, Ariz. 99344

[21] Appl. No.: 608,483

[22] Filed: Nov. 2, 1990

[51] Int. Cl.⁵ .............................................. A01G 25/00
[52] U.S. Cl. ........................................... 47/79; 47/73; 47/75
[58] Field of Search ................................. 47/79, 75, 73

[56] References Cited

U.S. PATENT DOCUMENTS

| 608,664 | 8/1898 | Free | 47/79 |
| 1,251,125 | 12/1917 | Smith | 47/79 |
| 1,533,342 | 4/1925 | Schein | 47/79 |
| 2,387,340 | 10/1945 | Moriarty | 47/79 |
| 4,027,429 | 6/1977 | Georgi | 47/73 |

FOREIGN PATENT DOCUMENTS

| 3732119 | 4/1988 | Fed. Rep. of Germany | 47/79 |
| 873001 | 7/1961 | United Kingdom | 47/79 |

Primary Examiner—Richard E. Chilcot, Jr.
Assistant Examiner—Joanne C. Downs
Attorney, Agent, or Firm—Richard C. Litman

[57] ABSTRACT

A double-walled plant pot has a single water-permeable bottom, a permeable inner side wall, and an impermeable outer side wall. The space between the walls is filled with a fertilizer mixture whose concentration of fertilizer increases with depth. Thus larger plants obtain more fertilizing nutrients. The inner wall, bottom, and outside may be separable.

8 Claims, 1 Drawing Sheet

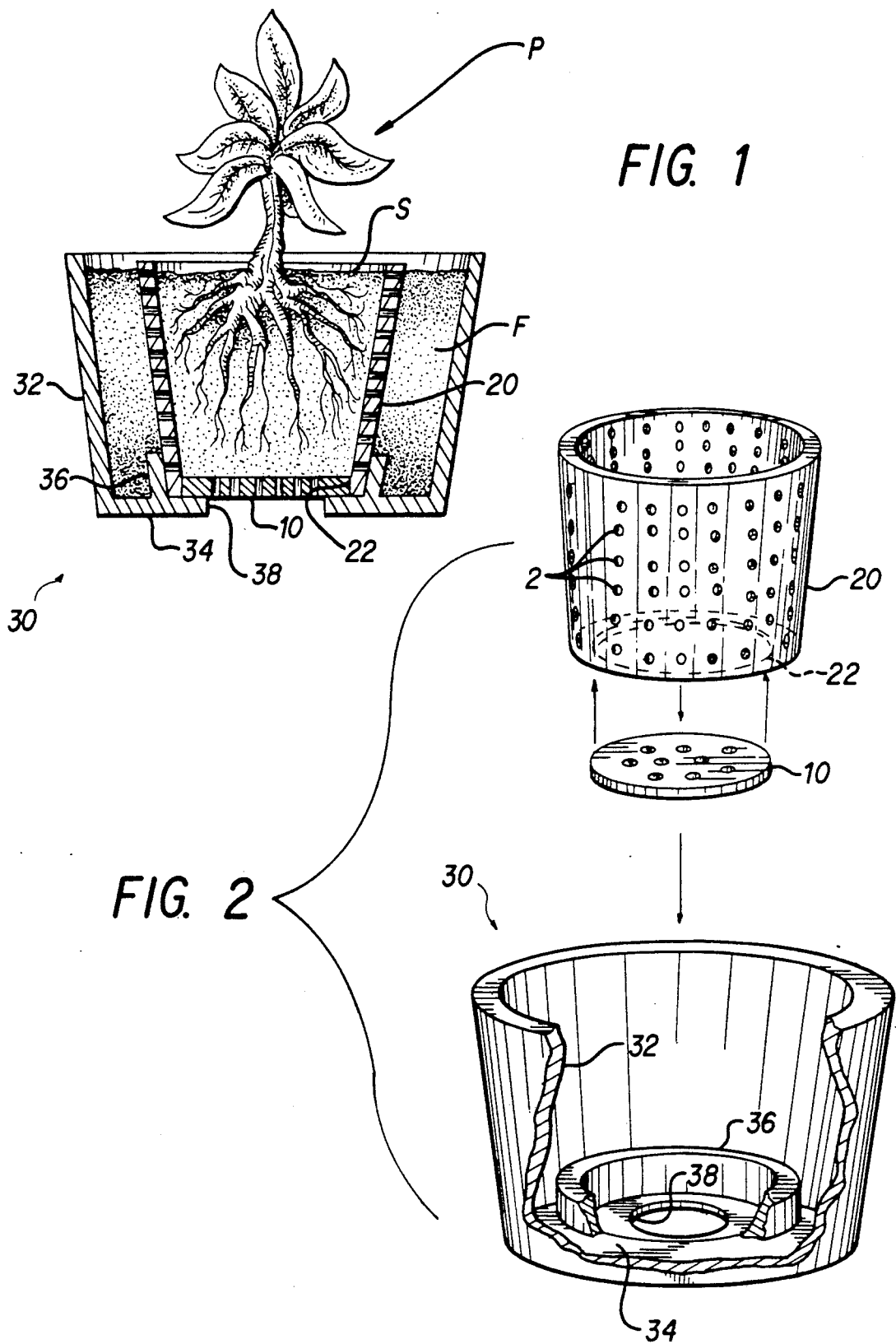

DOUBLE-WALLED PLANT POT WITH GRADUATED FERTILIZER

FIELD OF THE INVENTION

The present invention relates to plant pots with fertilizer holding spaces.

DESCRIPTION OF THE PRIOR ART

Double-walled plant pots are well known in the horticulture field. A very common type of pot, though not truly double-walled, is one with a perforated bottom and an integral dish or bowl beneath to hold water. Many double-walled plant pots use the space between the walls to hold water; some involve fertilizer as well. These and others are discussed below.

Edling, in U.S. Pat. No. 4,344,251, discloses a pot having a removable inside plate spaced above the bottom of the pot. The soil and plant rest on top of the plate. The space below the plate is full of water, which wicks upward to the soil and plant through a porous ceramic rod or tube. The plate is itself impervious to water. Thin tubes are provided to allow filling the water space from outside. The plate is designed for use with a standard pot having a conical inner surface. The plate is held above the pot bottom by wedging against the walls. Edling's invention is not truly a double-walled pot.

Lancaster, in U.S. Pat. No. 4,040,207, shows a true double-walled pot; an inner pot nesting within an outer pot. Both pots are of impermeable material. They are arranged to leave a space between them. Special time-release fertilizer (such as Precise brand, made by 3M Company) is glued to the outside wall of the inner pot. Water is poured into the annular gap between the two pots' lips at the top, and runs down into the space defined by the bottoms of the inner and outer pots. The inner pot has large holes through the bottom to allow the water to enter the soil in the inner pot. Lancaster does not teach packing of the space between the walls with loose fertilizer, only adhesively coating the walls with fertilizer pellets.

Silver, in U.S. Pat. No. 4,096,663, discusses a clay pot coated on the lower part of the inside surface with an impervious layer. This pot is set into standing water inside a container. Water travels through the clay and is distributed to soil inside the pot from areas of the clay pot above the impervious coating. Improved moisture distribution is claimed for the device.

Dryer, in U.S. Pat. No. 4,160,342, discloses nesting pots, both of impervious material. The inner pot closely fits the outer pot along the upper two thirds, leaving no space between; below this the inner pot is much reduced in diameter to form a neck, which rests on the bottom of the outer pot. The space defined between the pots in the lower third—within the outer pot, surrounding the neck of the inner pot—is filled with water. The neck is filled with a wicking material. All the lower surfaces of the inner pot, including those of both the neck and the main portion, are holed for water passage. Thus water rises through the wicking material into the soil above, and excess water drains out. A side spout is provided for filling the water space.

U.S. Pat. No. Des. 250,401 of O'Shea et al shows a similar double pot.

The pot of de Oliveria, disclosed in U.S. Pat. No. 4,356,665, is much like that of Dryer, but has three separate necks instead of one in the lowermost third. Each neck has a small hole in the bottom to admit water to the soil in the inner pot. Water is admitted to the lower chamber, formed between the inner and outer pots, through a side spout also formed between the outer pot and the inner pot.

Bilstein, in U.S. Pat. No. 4,791,755, shows a permeable pot inside an impermeable one. The bottom is flooded with water; a float rod is used to ascertain the height of the water. The inner pot is filled with a special mixture of materials, such as plastic pellets, lava, and clay pieces, to control the water environment of the plant.

U.S. Pat. No. 4,161,844 of Hentschel et al shows a pot with an annular container on the bottom, containing fertilizer. It is intended for hydroponic use.

None of the above inventions and patents, taken either singly or in combination, is seen to describe the instant invention as claimed.

The prior art is not seen to disclose any double-walled plant pot which allows drainage of excess water from the bottom in the usual manner.

Neither is seen a pot having a space for loose organic fertilizer.

Nor is there seen an arrangement for adapting the amount of fertilizer to the needs of plants of various sizes.

Accordingly, one object of the present invention is a plant pot which has a fertilizer space for holding loose fertilizer.

Another object is a pot which is capable of adapting fertilizer concentrations to the size of a plant.

A further object is a double-walled pot which drains from the bottom.

These and other objects of the present invention will become readily apparent upon further review of the following specification and drawings.

SUMMARY OF THE INVENTION

The present invention is a plant pot with double side walls and a single bottom surrounding a soil space. The inner side wall and the bottom are made permeable by numerous perforations which are sized to allow water, but not soil or fertilizer, to pass through. Planting soil is placed in the central part of the pot, and the space between the double walls is filled with fertilizer mixture.

Typically, the bottom of the pot will be a disc and the inner and outer walls are sections (frustums) of a cone. The outer wall cone is larger in diameter, but is inclined at the same angle as the inner cone.

The fertilizer mixture between the walls contains a variable proportion of fertilizer to inert ingredients. This proportion is vertically varied: the amount of fertilizer increases with depth. Thus a young plant with shallow roots, which needs less fertilizer due to its small size, will not be over-fertilized; when the plant grows large, and needs more, its roots will reach to the lower regions where more fertilizer is to be found.

Organic fertilizer is preferred.

Preferably, the pot is made up of three separable parts: a perforated bottomless inner sleeve (the inner wall); a perforated bottom plate (the central part of the pot bottom); and an impermeable outer container with an opening in the lower end. This opening is slightly smaller than the bottom plate, to support it. The outer container includes the side wall, a ledge (the outer annular part of the bottom surrounding the plate), and a lip on the ledge adapted to hold the perforated bottom plate and the inner sleeve in their positions.

The bottom plate fits within the lowermost inner edge of the inner sleeve. This construction allows a plant to be easily removed by merely pushing upward on the bottom plate. The soil and the intact root system of the plant will then slide out.

BRIEF DESCRIPTION OF THE DRAWINGS

FIG. 1 is a cross section of the present invention showing a plant in soil held by the bottom plate and side sleeve, and fertilizer held between the inner wall sleeve and the outer wall or container.

FIG. 2 is an exploded perspective view showing the container, bottom plate, and inner sleeve. No soil, fertilizer or plant is shown in FIG. 2.

Similar reference characters denote corresponding features consistently throughout the attached drawings.

DETAILED DESCRIPTION OF THE PREFERRED EMBODIMENT

FIG. 1 shows the instant invention assembled and holding soil S and fertilizer mixture F. A plant P is rooted in soil S.

The soil is held in a soil space defined by an inner wall and a bottom. The inner wall element is a sleeve 20, and the bottom is a plate 10. The plate 10 fits within the open lower end of the sleeve 20.

Both the bottom plate 10 and the inner sleeve 20 are permeable to water. Preferably, permeability is achieved by numerous perforations 2 as shown most clearly in FIG. 2. These perforations should be sized to allow water, but not soil or fertilizer mixture particles, to pass through.

The plate 10 and inner sleeve 20 will normally be formed of impermeable materials such as metal or plastic. However, they could also be formed of other, permeable materials such as fired clay, rigid open-cell foam, and the like, which require no perforations 2.

Partially surrounding and supporting the plate 10 and sleeve 20 is an outer container body 30, made of water-impermeable materials. The structure is most clearly shown in FIG. 2. The body includes an outer wall or sleeve 32 generally parallel to the inner sleeve 20, a lower retaining ledge 34 having the shape of an annular disc, and a lip 36 on the upper surface of the ledge. These parts are either formed as one piece, as by molding, or are joined permanently, as by welding.

The outer sleeve 32, together with the inner sleeve 20 and that portion of the ledge 34 outside of the lip 36, acts to define a fertilizer holding space. Fertilizer mixture may be held in this space as shown in FIG. 1.

The inner sleeve 20 is located relative to the outer sleeve 32 by the lip 36. The bottom plate 10 is located horizontally by the inside surface of the open lower end of the inner sleeve 20, and is located vertically by gravity and the inner edge 38 of the ledge 34.

The open area inside the inner edge 38 allows excess water to drain from the soil S through the permeable bottom plate 10.

The fertilizer mixture F is preferably composed of organic fertilizer and inert ingredients. The proportion of fertilizer to inert ingredients is variable. In the present invention this proportion may be varied from place to place within the fertilizer holding space to help growing plants absorb the proper amount of fertilizer. As plants will generally be located centrally in the soil S, the symmetry of the plant and pot lead to the conclusion that variations in fertilizer proportion will be most useful if the variation is a function of vertical height, or, equivalently, distance from the ledge 34.

Preferably, the proportion will be higher in the lower parts of the mixture F, for the reasons following.

A small young plant in the soil S will have a shallow root system; it also requires less fertilizer than a larger plant. As the young plant's roots reach out toward the fertilizer holding space, they will encounter a relatively low concentration of fertilizer and avoid "burning" of the roots.

Later, when the plant has grown, it will require more nutrients. The roots will now reach toward the bottom of the pot, and will encounter a higher concentration of fertilizer there due to the higher proportion of fertilizer in the mixture F.

During a watering cycle, the drainage of water downward from the top surface of the soil S will carry leached nutrients downward. Thus the amount of nutrient released during a watering cycle increases with depth. Also, the outer sleeve 34, retaining ledge 34, and lip 36 together form a reservoir which retains a portion of the natural concentration of organic fertilizer nutrients.

It will be seen that the three components of the present invention (that is, the plate 10, sleeve 20, and body 30) are each adapted to nesting when stacked. This will allow the present invention to be stored and shipped in a small volume.

It is to be understood that the present invention is not limited to the sole embodiment described above, but encompasses any and all embodiments within the scope of the following claims.

For example, the pot could be made as one unit, with the bottom 10, sleeve 20, and body 30 integral. Or, the shapes of the pieces could vary from that shown in the figures: the bottom plate could be concave, the sides square, etc.

I claim:

1. A plant pot comprising:
    a water permeable inner container comprising
    an inner sleeve having an open lower end and
    a bottom plate adapted to close said open lower end, said bottom plate separable from said inner sleeve; and
    an impermeable outer container body adapted to support said bottom plate and said inner sleeve, said body further comprising
    an outer sleeve adapted to substantially surround said inner sleeve to define a fertilizer holding space therebetween, said outer sleeve having a lower edge,
    a retaining ledge extending inwardly from said lower edge, said retaining ledge having an inner edge, said inner edge defining an open area therewithin, said open area adapted to be covered by said bottom plate, and
    a lip extending upwardly from said retainer ledge, said lip adapted with said retaining ledge to closely encircle and support said bottom plate, said lip adapted to hold said inner sleeve in a position relative to said outer body to define said fertilizer holding space between said inner sleeve and said outer sleeve, said inner sleeve disposed above said bottom plate when in said position; whereby
    when said inner sleeve is held in said position above said bottom plate and said bottom plate is encircled by said lip, said bottom plate closes said open lower end of said inner sleeve, and said bottom plate and said inner sleeve together define a soil space for holding soil and a plant or plants therewithin.

2. A pot as in claim 1, including
a fertilizer mixture disposed within said fertilizer holding space for fertilizing a plant growing in soil in said soil space, said mixture including fertilizer.

3. A pot as in claim 2, wherein
said fertilizer mixture contains a variable proportion of fertilizer to other ingredients, said proportion being a function of distance from said retainer ledge.

4. A pot as in claim 3, wherein
said proportion decreases with distance from said retainer ledge.

5. A pot as in claim 1, wherein
said inner sleeve defines a first curved surface of a smaller frustum of a cone, and
said outer sleeve defines a second curved surface of a larger frustum of the cone,
said frustums are coaxial when said inner sleeve is in said position relative to said outer body, whereby
said first curved surface is disposed within said second curved surface to define said fertilizer holding space therebetween.

6. A pot as in claim 5, including
a fertilizer mixture disposed within said fertilizer holding space for fertilizing a plant growing in soil in said soil space, said mixture including fertilizer.

7. A pot as in claim 6, wherein
said fertilizer mixture contains a variable proportion of fertilizer to other ingredients, said proportion being a function of distance from said retainer ledge.

8. A pot as in claim 7, wherein
said proportion decreases with distance from said retainer ledge.

* * * * *

UNITED STATES PATENT AND TRADEMARK OFFICE
CERTIFICATE OF CORRECTION

PATENT NO. : 5,044,120

DATED : Sept. 3, 1991

INVENTOR(S) : David M. Couch

It is certified that error appears in the above-identified patent and that said Letters Patent is hereby corrected as shown below:

ON TITLE PAGE:   Item [76]

The inventor's correct address should read

11881 Fortuna Road #82
   Yuma, AZ 85365

Signed and Sealed this

Fourteenth Day of January, 1992

Attest:

HARRY F. MANBECK, JR.

*Attesting Officer*      *Commissioner of Patents and Trademarks*